United States Patent
Kim et al.

(10) Patent No.: US 8,761,063 B2
(45) Date of Patent: Jun. 24, 2014

(54) METHOD AND APPARATUS FOR TRANSMITTING A PACKET IN A WIRELESS NETWORK

(75) Inventors: Joong Heon Kim, Seoul (KR); Beom Jin Jeon, Seoul (KR); Young Wook Kang, Seoul (KR); Hyeon Cheol Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 65 days.

(21) Appl. No.: 13/377,134

(22) PCT Filed: Jun. 9, 2010

(86) PCT No.: PCT/KR2010/003691
§ 371 (c)(1),
(2), (4) Date: Dec. 8, 2011

(87) PCT Pub. No.: WO2010/143880
PCT Pub. Date: Dec. 16, 2010

(65) Prior Publication Data
US 2012/0082076 A1    Apr. 5, 2012

Related U.S. Application Data

(60) Provisional application No. 61/185,203, filed on Jun. 9, 2009.

(51) Int. Cl.
| H04W 74/04 | (2009.01) |
| H04N 7/26 | (2006.01) |
| H04W 4/20 | (2009.01) |
| H04N 21/4363 | (2011.01) |
| H04N 21/2343 | (2011.01) |
| H04W 80/02 | (2009.01) |
| H04W 84/10 | (2009.01) |
| H04W 28/06 | (2009.01) |

(52) U.S. Cl.
CPC ......... *H04W 4/203* (2013.01); *H04N 21/43637* (2013.01); *H04W 80/02* (2013.01); *H04N 21/234327* (2013.01); *H04W 84/10* (2013.01); *H04W 28/065* (2013.01)
USPC ............ 370/310; 370/392; 375/240; 725/105

(58) Field of Classification Search
CPC ....... H04W 4/00; H04W 24/10; H04W 28/06; H04N 21/4126; H04N 21/42607; H04N 21/42688
USPC ............. 348/723; 370/252, 310, 392, 395.64; 375/240, E7.004, E7.026, E7.078, 375/E7.089
See application file for complete search history.

(56) References Cited

U.S. PATENT DOCUMENTS

| 7,385,951 B2 * | 6/2008 | Balachandran et al. ...... 370/329 |
| 8,149,795 B2 * | 4/2012 | Kwon et al. ................. 370/336 |

(Continued)

FOREIGN PATENT DOCUMENTS

| KR | 1020080021459 | 3/2008 |
| KR | 1020080021460 | 3/2008 |

*Primary Examiner* — Edan Orgad
*Assistant Examiner* — Emmanuel Maglo
(74) *Attorney, Agent, or Firm* — Lee, Hong, Degerman, Kang & Waimey

(57) ABSTRACT

The present invention related to a method in which a transmitting device transmits a packet in a wireless network, wherein said method comprises: a step of receiving, from an upper layer, video data divided into a plurality of slices and compressed into one or more types of layers; a step of constructing a MAC packet such that information on the types of said one or more layers of the video data is included in a MAC header of the MAC packet; and a step of delivering the MAC packet to a lower layer to transmit the MAC packet to a receiving device.

8 Claims, 14 Drawing Sheets

(56) References Cited

U.S. PATENT DOCUMENTS

| | | |
|---|---|---|
| 2003/0112778 A1 | 6/2003 | Lundby |
| 2004/0004959 A1* | 1/2004 | Itakura .......................... 370/352 |
| 2007/0270121 A1* | 11/2007 | Shao et al. .................... 455/403 |
| 2008/0095072 A1* | 4/2008 | Shao et al. .................... 370/254 |
| 2008/0130543 A1* | 6/2008 | Singh et al. ................... 370/311 |
| 2008/0130617 A1* | 6/2008 | Singh et al. ................... 370/345 |
| 2008/0134271 A1* | 6/2008 | Qin et al. ...................... 725/118 |
| 2008/0198801 A1* | 8/2008 | Kesselman et al. ........... 370/329 |

* cited by examiner ated on Jun. 12, 2003 defines Wireless Medium
METHOD AND APPARATUS FOR TRANSMITTING A PACKET IN A WIRELESS NETWORK

CROSS-REFERENCE TO RELATED APPLICATIONS

This application is the National Stage filing under 35 U.S.C. 371 of International Application No. PCT/KR2010/003691, filed on Jun. 9, 2010, which claims the benefit of U.S. Provisional Patent Application No. 61/185,203 filed on Jun. 9, 2009, the contents of which are all hereby incorporated by reference herein in their entirety.

TECHNICAL FIELD

The present invention relates to a wireless communication system, and more particularly, to a method and apparatus for transmitting a packet including data type information in a packet header at a transmission device of a wireless personal area network (WVAN) system.

BACKGROUND ART

Recently, a Bluetooth or Wireless Personal Area Network (WPAN) technology for establishing a wireless network between a relatively small number of digital devices in a restricted space such as home or small-size office so as to exchange audio or video data has been developed. The WPAN may be used to exchange information between a relatively small number of digital devices within a relatively close distance so as to achieve low power consumption and low-cost communication between the digital devices. The IEEE 802.15.3 approved on Jun. 12, 2003 defines Wireless Medium Access Control (MAC) and Physical Layer (PHY) Specifications for High Rate Wireless Personal Area Networks (WPANs).

FIG. 1 is a view showing the configuration example of a WPAN.

As shown in FIG. 1, the WPAN is a network established between personal devices in a restricted space such as a home, and the devices may directly communicate with each other so as to establish the network and exchange information between applications without interruption. Referring to FIG. 1, the WPAN is composed of two or more user devices 11 to 15 and one of the devices operates as a coordinator 11. The coordinator 11 serves to provide basic timing of the WPAN and to control Quality of Service (QoS) requirements. Examples of the devices include all digital devices such as a computer, a Personal Digital Assistant (PDA), a laptop, a digital television, a camcorder, a digital camera, a printer, a microphone, a speaker, a headset, a barcode reader, a display, and a mobile phone.

The WPAN is an ad hoc network (hereinafter, referred to as "piconet") which is not designed and established in advance, but is established if necessary without the help of a central infrastructure. A process of establishing one piconet will now be described in detail. The piconet is started when a certain device, which may operate as a coordinator, performs the function of a coordinator. All the devices perform scanning before a new piconet is started or before being associated with the existing piconet. The scanning refers to a process of, at a device, collecting and storing information about channels and determining whether the existing piconet is present. A device which receives an instruction to start a piconet from a higher layer establishes a new piconet without being associated with a piconet which is previously established. The device selects a channel with less interference based on data acquired by the scanning process and broadcasts a beacon via the selected channel, thereby starting the piconet. The beacon is control information which is broadcast by the coordinator in order to control and manage the piconet, such as timing allocation information and information about the other devices within the piconet.

FIG. 2 shows an example of a superframe used in a piconet. The timing control of the piconet is mandatorily performed based on the superframe. Referring to FIG. 2, each superframe is started by a beacon transmitted from a coordinator. A Contention Access Period (CAP) is used for devices to transmit commands or asynchronous data using a contention-based method. A channel time allocation period may include Management Channel Time Blocks (MCTBs) and Channel Time Blocks (CTBs). The MCTB is a period in which control information may be transmitted between a coordinator and a device or between a device and a device, and the CTB is a period in which asynchronous or isochronous data may be transmitted between a device and a coordinator or between different devices. In each superframe, the numbers, the lengths and the locations of CAPs, MCTBs and CTBs are determined by the coordinator and are transmitted to other devices within the piconet via a beacon.

When a certain device within a piconet needs to transmit data to a coordinator or another device, the device requests channel resources used for data transmission from the coordinator, and the coordinator allocates the channel resources to the device within an available channel resource range. If a CAP is present within a superframe and the coordinator permits data transmission in the CAP, the device may transmit a small amount of data via the CAP without the need for the coordinator to allocate a channel time to the device.

If the number of devices within the piconet is small, channel resources used for enabling the devices to transmit data are sufficient and thus no problem occurs in channel resource allocation. However, if the number of devices is large and thus channel resources are insufficient or if a large amount of data such as a moving image is transmitted, the channel resources may not be allocated to the other devices even when the other devices have data to be transmitted.

In a data communication process between two or more devices belonging to the WVAN, communication quality may be deteriorated according to device environment, such as occurrence of an obstacle interrupting communication between devices, change in distance between both devices or locations of both devices or interference between adjacent different devices.

Accordingly, research into a method of smoothly and efficiently perform data communication between devices configuring the WVAN is ongoing.

DISCLOSURE

Technical Problem

If video data is transmitted without being compressed in a wireless communication system, a data transfer rate necessary to transmit the uncompressed video data may not be secured according to a channel status. In this case, a method of compressing the video data and transmitting the compressed video data is used. In order to minimize transmission delay when using the compression transmission method, a method of dividing one screen into a plurality of slices and compressing each of the slices is used. The compressed slices may be separated into a plurality of layers according to a priority of data and may be configured to be transmitted in layer units according to a channel status.

An object of the present invention is to provide a method of including data type information in a certain portion of a MAC header and differently transmitting the data type information on a per layer basis according to a priority of data in order to more efficiently transmit the data type information of video data including a plurality of layers.

Another object of the present invention is to provide a transmission method of adaptively applying a transmission policy such as a transmission mode and transmission priority of each layer configuring video data according to a priority of data.

The technical problems solved by the present invention are not limited to the above technical problems and those skilled in the art may understand other technical problems from the following description.

Technical Solution

The object of the present invention can be achieved by providing a method for transmitting a packet at a transmission device of a wireless network, the method including receiving video data divided into a plurality of slices and compressed into one or more layer types from a higher layer, configuring a medium access control (MAC) packet, the MAC packet comprising layer type information which includes type information of the one or more layers configuring the video data, and transmitting the MAC packet to a lower layer for transmission to a reception device.

At this time, the type information may include a priority of a layer.

At this time, the one or more layers may include a base layer which is mandatorily included in the compressed video data and one or more enhancement layers which are selectively included.

The video data may be compressed into the base layer or the enhancement layer according to a priority of data divided into the plurality of slices.

The configuring the MAC packet may further include receiving the type information from the higher layer, and the MAC packet may be configured based on the type information.

The type information may be included in a MAC extension header included in the MAC header.

At this time, the MAC extension header may include an extension control region, a region including type information of data to be transmitted through each of a plurality of subpackets included in the MAC packet, a region including antenna direction tracking feedback information, a region including ACK signal group information, and one or more regions including clock information of data, and the type information may be included in the data type information region.

The lower layer may schedule at least one of a transmission mode of each layer, transmission priority or whether the same layer is retransmitted depending on whether an ACK signal is received, according to the type information, when the MAC packet is transmitted.

The transmission mode may be divided according to parameters regarding a data coding mode, a modulation scheme, a coding rate, and a data transfer rate configuring the transmission mode.

In another aspect of the present invention, there is provided a method for receiving a packet at a reception device of a wireless network, including receiving a medium access control (MAC) packet corresponding to video data divided into a plurality of slices and compressed into one or more layers from a transmission device; and performing decoding using layer type information which includes the type information of the one or more layers, the layer type information being included in a MAC header of the MAC packet.

In another aspect of the present invention, there is provided a transmission device of a wireless network, including a transmission module configured to transmit a data packet; and a processor configured to divide video data into a plurality of slices, compress the video data into one or more layers, and configure a medium access control (MAC) packet, the MAC packet comprising layer type information which includes type information of the one or more layers configuring the video data, wherein the processor transmits the MAC packet to a reception device through the transmission module.

The processor may compress the video data into the base layer or the enhancement layer according to a priority of data divided into the plurality of slices when compressing the video data into the one or more layers.

The processor may configure the MAC packet, in which the type information is included in a MAC extension header included in a MAC header.

In another aspect of the present invention, there is provided a reception device of a wireless network, including a reception module configured to receive a packet, and a processor configured to decode the packet received through the reception module, wherein the packet corresponds to video data divided into a plurality of slices and compressed into one or more layers, and wherein the processor performs decoding using layer type information which includes the type information of the one or more layers, the type information being included in a medium access control (MAC) header of the received packet.

It will be understood that the above embodiments are only some of the preferred embodiments of the present invention and various embodiments having the technical features of the present invention may be derived from the detailed description of the present invention by those skilled in the art.

Advantageous Effects

According to the embodiments of the present invention, a transmission device according to an embodiment of the present invention can include data type information in a certain portion of a MAC header and transmit the data type information in order to more easily transmit the data type information of video data including a plurality of layers.

A transmission device according to an embodiment of the present invention can perform transmission by adaptively applying a transmission policy such as a transmission mode and transmission priority of each layer configuring video data according to a priority of data.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE

Additional advantages, objects, and features of the invention will be more readily apparent from consideration of the following detailed description relating to the accompanying drawings. The following embodiments are examples in which the technical features of the present invention are applied to a Wireless Video Area Network (WVAN) which is one type of Wireless Personal Area Network (WPAN).

Figure 3:
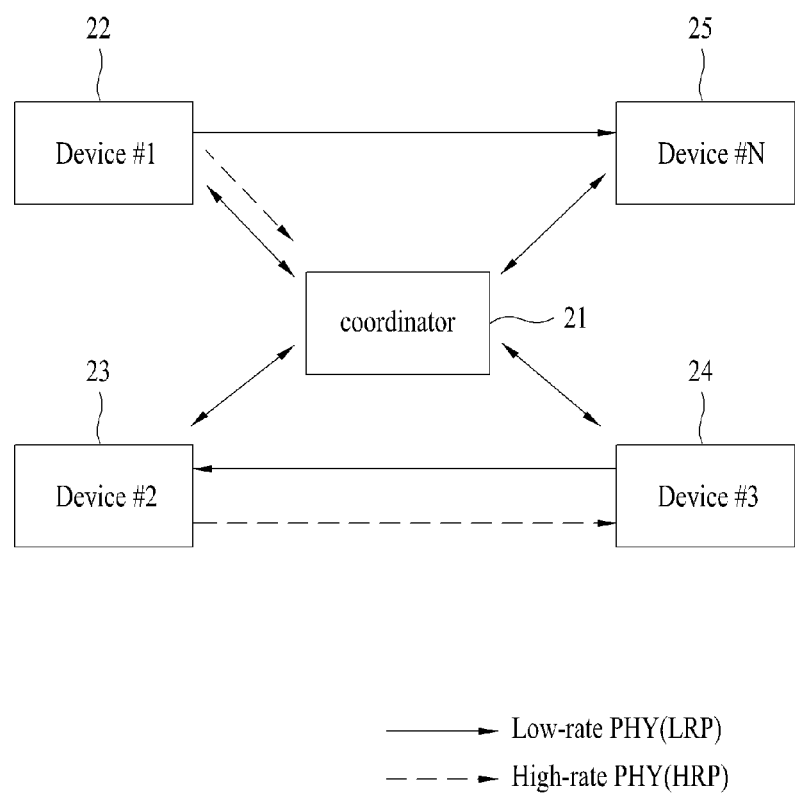
FIG. 3 is a view showing an example of the configuration of a Wireless Video Area Network (WVAN)

FIG. 3 is a view showing an example of the configuration of a WVAN. Like the WPAN shown in FIG. 1, the WVAN includes two or more user devices 32 to 35, and one device operates as a coordinator 31. The coordinator 31 serves to provide basic timing of the WVAN, to hold the tracks of the devices belonging to the WVAN, and to control Quality of Service (QoS) requirements. Since the coordinator is also the device, the coordinator performs the function of one device belonging to the WVAN as well as the function of the coordinator. The other devices 32 to 35 excluding the coordinator, may initiate stream connection.

Figure 1:
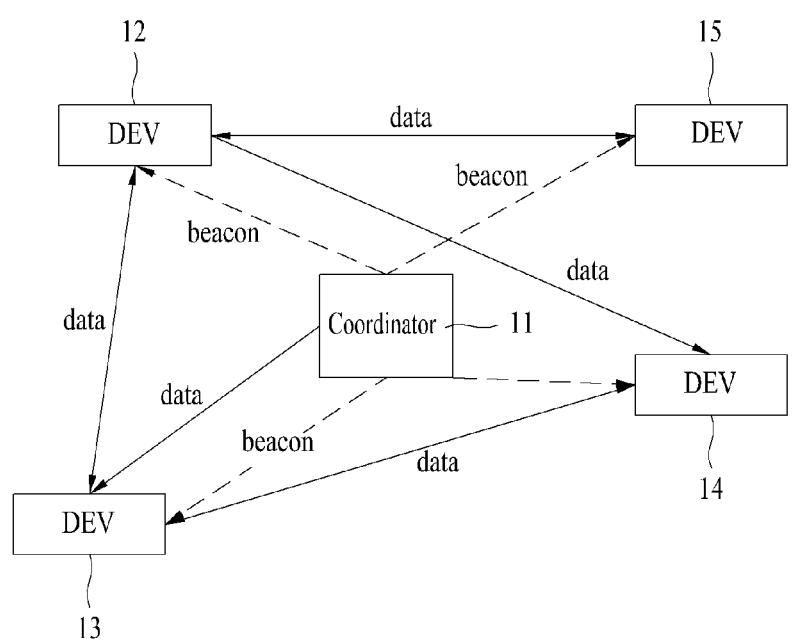
FIG. 1 is a view showing the configuration example of a Wireless Personal Area Network (WPAN)
Figure 2:
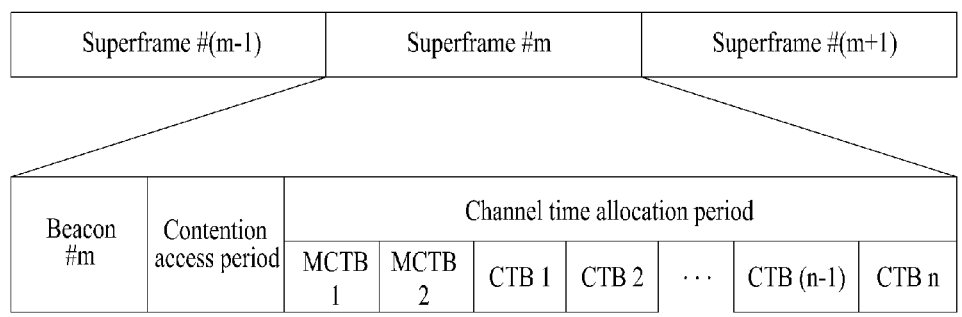
FIG. 2 is a view showing an example of a superframe used in a piconet.

The WVAN shown in FIG. 3 is different from the WPAN of FIG. 1 in that two types of Physical (PHY) layers are supported. That is, the WVAN supports a high-rate physical (HRP) layer and a low-rate Physical (LRP) layer. The HRP layer is a physical layer which can support a data transfer rate of 1 Gb/s or more and the LRP layer is a physical layer which supports a data transfer rate of several Mb/s. The HRP layer is highly directional and is used to transmit isochronous data streams, asynchronous data, Media Access Control (MAC) command and Audio/Video (A/V) control data through unicast connection. The LRP layer supports a directional or omni-directional mode, and is used to transmit a beacon, asynchronous data, and MAC command through unicast or broadcast. The coordinator 21 may transmit data to another device or receive data from another device using the HRP layer and/or the LRP layer. The other devices 22 to 25 of the WVAN may transmit or receive data using the HRP layer and/or the LRP layer.

Figure 4:
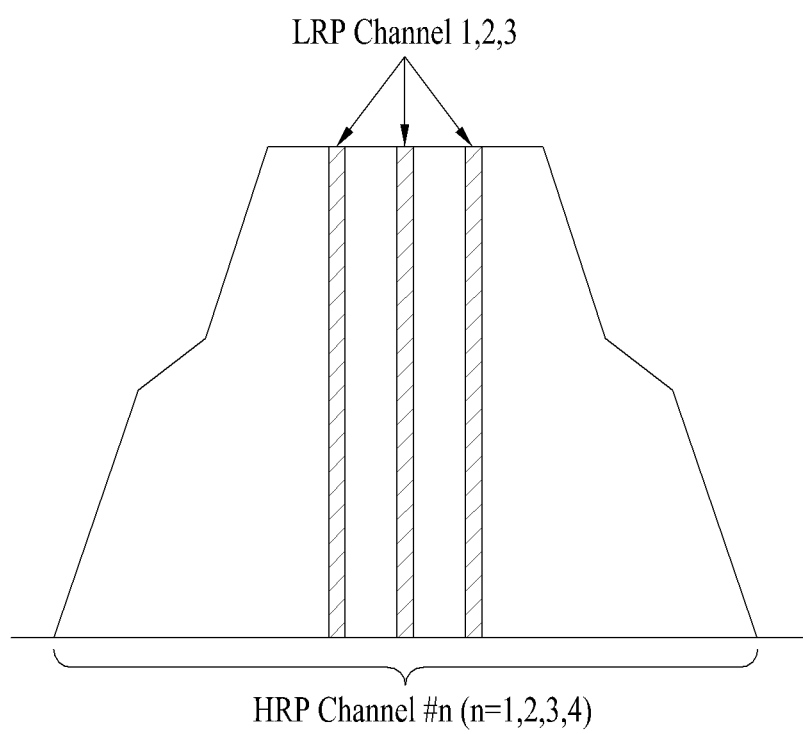
FIG. 4 is a view explaining the frequency band of high-rate physical (HRP) layer channels and low-rate physical (LRP) layer channels used in a WVAN.

FIG. 4 is a view explaining the frequency band of HRP channels and LRP channels used in a WVAN. The HRP uses four channels having a bandwidth of 2.0 GHz in a band of 57 to 66 GHz, and the LRP uses three channels having a bandwidth of 92 MHz. As shown in FIG. 4, the HRP channels and the LRP channels share the frequency band and the frequency band is divided and used according to a Time Division Multiplexing Access (TDMA) scheme.

Figure 5:
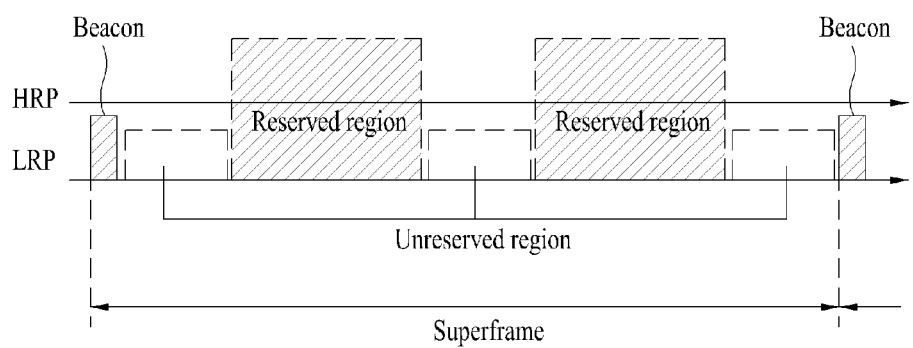
FIG. 5 is a view showing an example of a superframe structure used in a WVAN.

FIG. 5 is a view showing an example of a superframe structure used in a WVAN. Referring to FIG. 5, each superframe includes a beacon region in which a beacon is transmitted, a reserved region allocated to a certain device by a coordinator according to the requests of devices, and a unreserved region in which data is transmitted or received between a coordinator and a device or between a device and a device according to a contention-based method. These regions are temporally divided. The beacon includes timing allocation information and WVAN management and control information of the superframe. The reserved region is used to enable a device, to which the coordinator allocates a channel time according to a channel time allocation request of the device, to transmit data to another device. Commands, data streams or asynchronous data may be transmitted via the reserved region. If a specific device transmits data to another device via the reserved region, an HRP channel is used and, if a device which receives data transmits an Acknowledgement (ACK)/Negative ACK (NACK) signal for the received data, an LRP channel is used. The unreserved region may be used to transmit control information, MAC commands or asynchronous data between a coordinator and a device or between a device and a device. In order to prevent data collision between devices in the unreserved region, a Carrier Sense Multiple Access (CSMA) scheme or a slotted Aloha scheme may be applied. In the unreserved region, data may be transmitted via only an LRP channel. If the amount of control information or commands to be transmitted is large, a reserved region may be set in the LRP channel. The lengths and the numbers of the reserved regions and the unreserved regions in each superframe may be different for each superframe and are controlled by the coordinator.

Figure 6:
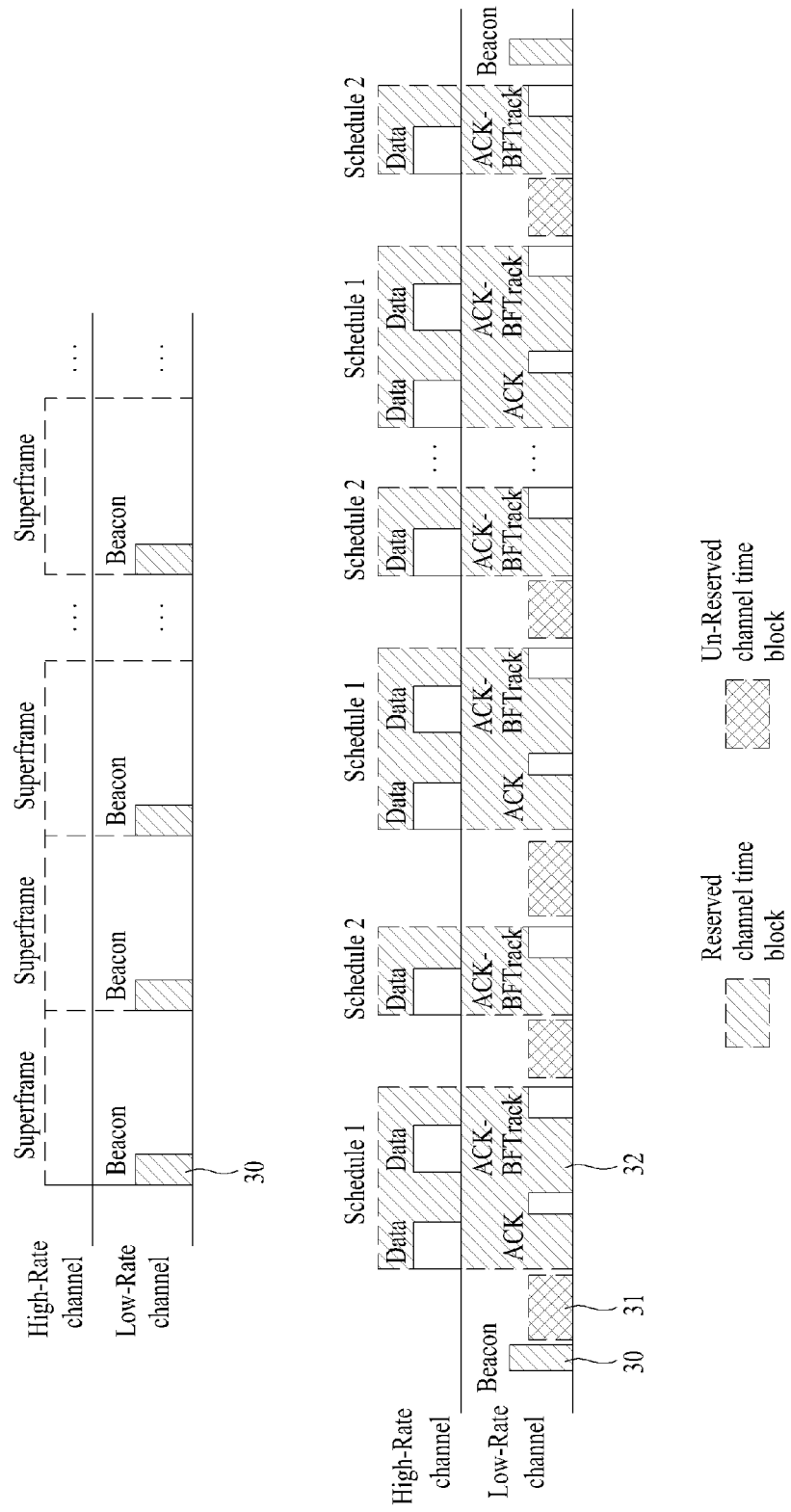
FIG. 6 is a view explaining another example of the superframe structure used in a WVAN.

FIG. 6 is a view explaining another example of the superframe structure used in a WVAN. Referring to FIG. 6, each superframe includes a region 60 in which a beacon is transmitted, a reserved channel time block 62 and an unreserved channel time block 61. The channel time blocks (CTBs) are temporally divided into a region (HRP region) in which data is transmitted via an HRP layer and a region (LRP region) in which data is transmitted via an LRP layer. The beacon 60 is periodically transmitted by the coordinator in order to identify an introduction portion of each superframe, and includes scheduled timing information, and WVAN management and control information. The device may perform data exchange in the network using the timing information and management/control information included in the beacon.

In the HRP region, the reserved CTB region may be used to enable the device, to which the coordinator allocates the channel time according to the channel time allocation request of the device, to transmit data to another device. If a specific device transmits data to another device via the reserved CTB region, an HRP channel is used and, if a device which receives data transmits an ACK/NACK signal for the received data, an LRP channel is used.

The unreserved CTB region may be used to transmit control information, MAC commands or asynchronous data between a coordinator and a device or between a device and a device. In order to prevent data collision between devices in the unreserved CTB region, a CSMA scheme or a slotted Aloha scheme may be applied. In the unreserved CTB region, data may be transmitted via only an LRP channel. If the amount of control information or commands to be transmitted is large, a reserved region may be set in the LRP channel. The lengths and the numbers of the reserved regions and the unreserved regions in each superframe may be different for each superframe and are controlled by the coordinator.

Although not shown in FIG. 6, the superframe includes a contention-based control period (CBCP) located next to the beacon, in order to transmit an urgent control/management message. The length of the CBCP is set so as not to exceed a predetermined threshold mMAXCBCPLen.

Figure 7:
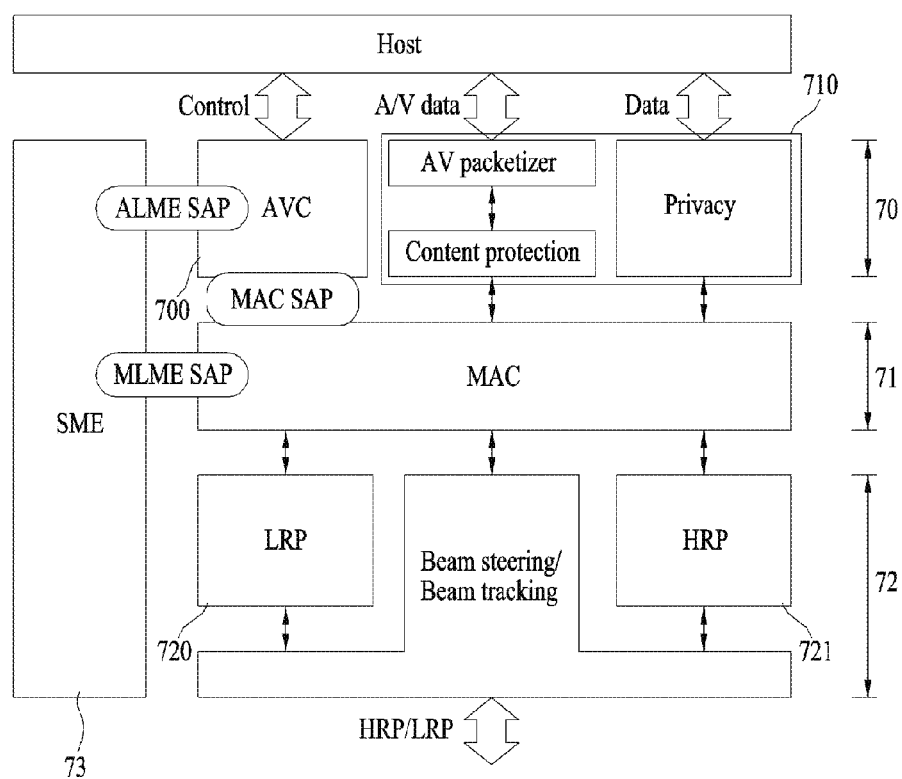
FIG. 7 is a view showing a protocol hierarchy implemented in a device of a WVAN.

FIG. 7 is a view showing a protocol hierarchy implemented in a device of a WVAN.

Referring to FIG. 7, a communication module of each of the devices included in the WVAN may be divided into four layers: an adaptation sublayer 70, a MAC layer 71, a PHY layer 72, and a Station Management Entity (SME) 73, according to functions. The station is a device which is distinguished from a coordinator, and the SME has the same meaning as a Device Management Entity (DME). The SME is a layer independent entity for controlling lower layers and collecting status information of the device from the layers. The SME includes an identity for managing each layer of a device communication module. An entity for managing the MAC layer is called a MAC Layer Management Entity (MLME) and an entity for managing the adaptation layer is called an Adaptation Layer Management Entity (ALME).

The adaptation sublayer 70 may include an audio video control (AVC) protocol 700 and an A/V packetizer 710. The AVC protocol (AVC layer) 700 is a higher layer which performs streaming connection and device control for A/V data transmission between a transmission device and a reception device. The adaptation sublayer includes the A/V packetizer 710 which configures a data format for data content protection and transmission, for an HRP data service such as A/V data and general data. The A/V packetizer 710 will be briefly described with reference to FIG. 8.

Referring to FIG. 7 again, the MAC layer 71 is a lower layer of a data transmission protocol and performs link setup, connection or disconnection, channel access, and reliable data transmission. That is, the MAC layer transmits a control/data message or controls a channel.

The PHY layer 72 may directly process A/V data or receive data processed by the MAC layer 31 and transmit the received data to another device. The PHY layer 72 switches a message requested by a higher layer such as the adaptation layer 70 or the MAC layer 71 in order to process a radio signal such that the request message is transmitted between devices by the PHY layer. The PHY layer includes two types of PHY layers including the HRP 720 and the LRP 721.

The layer of the device provides a service such as a high-rate service, a low-rate service, and a management service. The high-rate service is used to transfer video, audio and data and the low-rate service is used to transfer audio data, MAC commands and a small amount of asynchronous data. A simple message is exchanged before a data exchange process is performed between layers, and a message exchanged between different layers is called a primitive.

Figure 8:
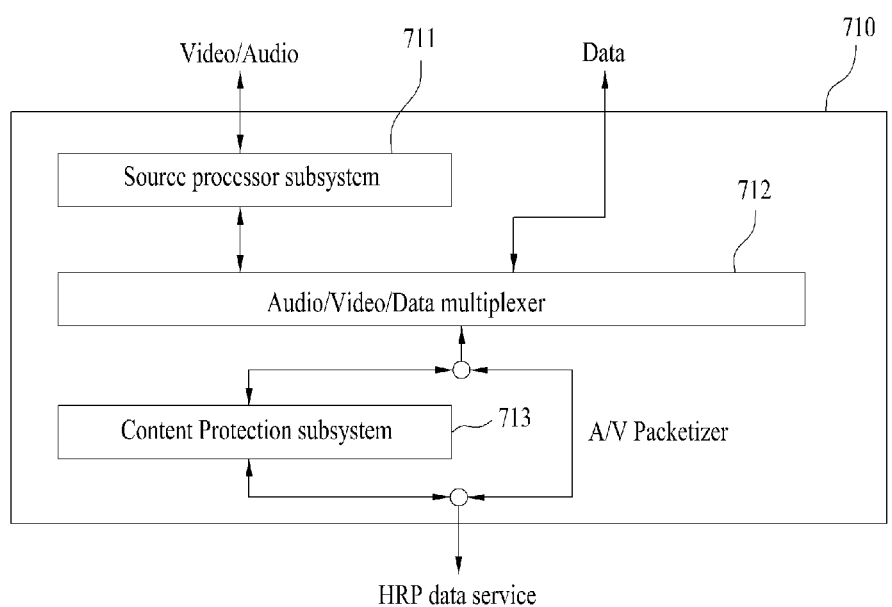
FIG. 8 is a diagram showing an example of an operation of an A/V packetizer included in the protocol hierarchy implemented in the device of the WVAN.

FIG. 8 is a diagram showing an example of the operation of the A/V packetizer included in the protocol hierarchy implemented in the device of the WVAN.

Referring to FIG. 8, the A/V packetizer may include a source processor subsystem 711, a multiplexer 712 for multiplexing A/V data and general data and a content protection subsystem 713. Hereinafter, the source processor subsystem 711 is referred to as a processor and the content protection subsystem 713 is referred to as a CP module.

The processor 711 of a transmission device packetizes uncompressed A/V data in order to improve quality of A/V data to be transmitted. The processor 711 compresses uncompressed data in order to increase data transfer efficiency and has the same meaning as an encoder. A packetizing process also has the same meaning as an encoding process.

The compressed A/V data is multiplexed with non-encoded data by the multiplexer 712, is subjected to a data protection process by the CP module 713, and is transmitted to a MAC/PHY layer for an HRP data transmission service.

The A/V packetizer included in a reception device which receives HRP data may decode data received by the source processor subsystem and configure a plurality of slices as one video frame.

On the contrary, if data is transmitted without being compressed, a radio link may not have sufficient capacity to meet an uncompressed data transmission rate (e.g., obstacle crossing) according to channel statuses. When the reception device displays received data, image quality of the displayed data may be deteriorated.

Accordingly, generally, as an example of a method of increasing image quality, a video frame may be divided into a plurality of slices and each slice may be compressed and transmitted using a data compression transmission method in order to minimize compressed data transmission delay.

The present invention proposes a method of dividing and compressing video data in layer units and adaptively transmitting the video data according to a priority of data in order to improve quality of the video data transmitted from a transmission device to a reception device in a WVAN system.

Figure 9:
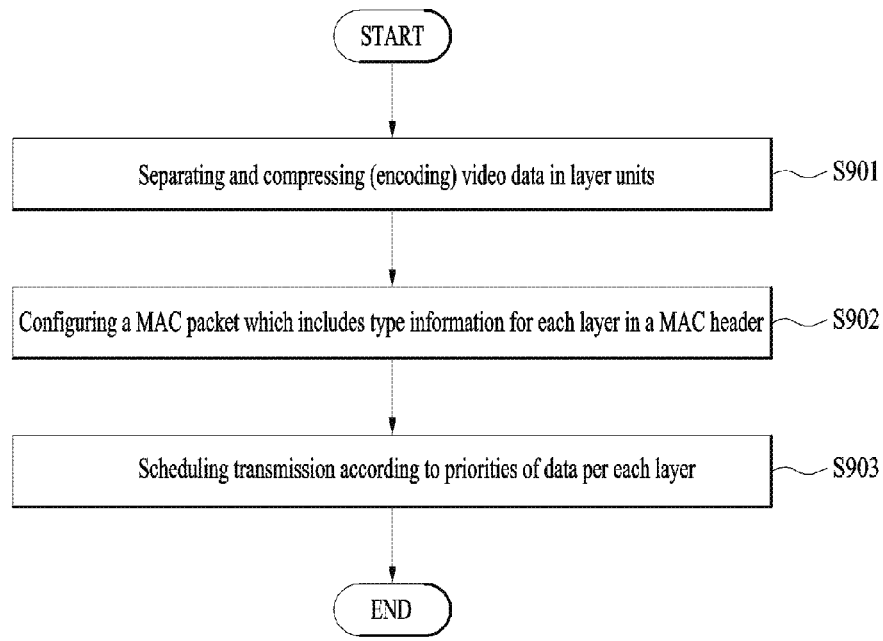
FIG. 9 is a flowchart illustrating an example of a method of transmitting video data at a transmission device in a WVAN system according to an embodiment of the present invention.

FIG. 9 is a flowchart illustrating an example of a method for transmitting video data at a transmission device in a WVAN system according to an embodiment of the present invention.

Referring to FIG. 9, the A/V packetizer 710 of the transmission device divides a video frame of video data to be transmitted into a plurality of slices and encodes each slice into a bit stream composed of layers (S901).

The types of the layers configuring the video data may be divided into a base layer (BS) which is mandatorily included and one or more enhancement layers (ELs) added to the BL. The BL is used to provide basic image quality of the video data and the EL is selectively added in order to improve the image quality of the video data.

Among methods for encoding the video data into the bit stream, scalable video coding (SVC) may be used as an example of an encoding method for adaptively implementing image quality of each slice according to link status. SVC is video encoding technique of configuring one bit stream with spatial resolution, quality and various frame rates so as to provide an optimal service to various devices belonging to various network environments and restoring a received bit stream at a reception device according to performance thereof. The bit stream subjected to SVC according to an embodiment of the present invention will be briefly described with reference to FIG. 10.

Next, the encoded video data bit stream is multiplexed with another video bit stream, audio bit stream or data and is transmitted to the MAC layer 71 of FIG. 7. The MAC layer 71 configures a MAC packet corresponding to the multiplexed bit stream (S902). The MAC layer may configure the MAC packet including layer type information based on information (BL or EL) about layer types received from a higher layer along with one or more layers.

More specifically, the MAC layer 71 may include the information about the types of the layers configuring the video data in a predetermined region of the MAC packet. At this time, since transmission priority of each layer may be specified according to a priority of data, information about transmission priority of a subpacket included in each layer or a priority of data included in a subpacket may be derived from the layer information.

A MAC header including information about a layer of video data according to an embodiment of the present invention will be briefly described with reference to FIG. 11.

The configured MAC packet is transmitted to the PHY layer 72 of FIG. 7.

The PHY layer according to the embodiment of the present invention adaptively schedules an HRP transmission mode of the packet, transmission priority and whether the packet is retransmitted depending on whether an ACK signal of each layer is received based on the layer information included in the MAC header (S903).

For example, a transmission mode having a low transfer rate but satisfying high stability may be applied to a high-priority layer and a transmission mode satisfying low stability but having a high transfer rate may be applied to a low-priority layer. Information about the transmission mode of each layer may be indexed in the MAC header of the video data packet, which will be described below.

At this time, transmission priority of each layer may be determined in consideration of a priority of data, network management delay, packet error, influence of change in channel status and network complexity of video image quality, and a determination as to whether an ACK/NACK mode for receiving an ACK/NACK signal of each layer is applied may be made.

Figure 10:
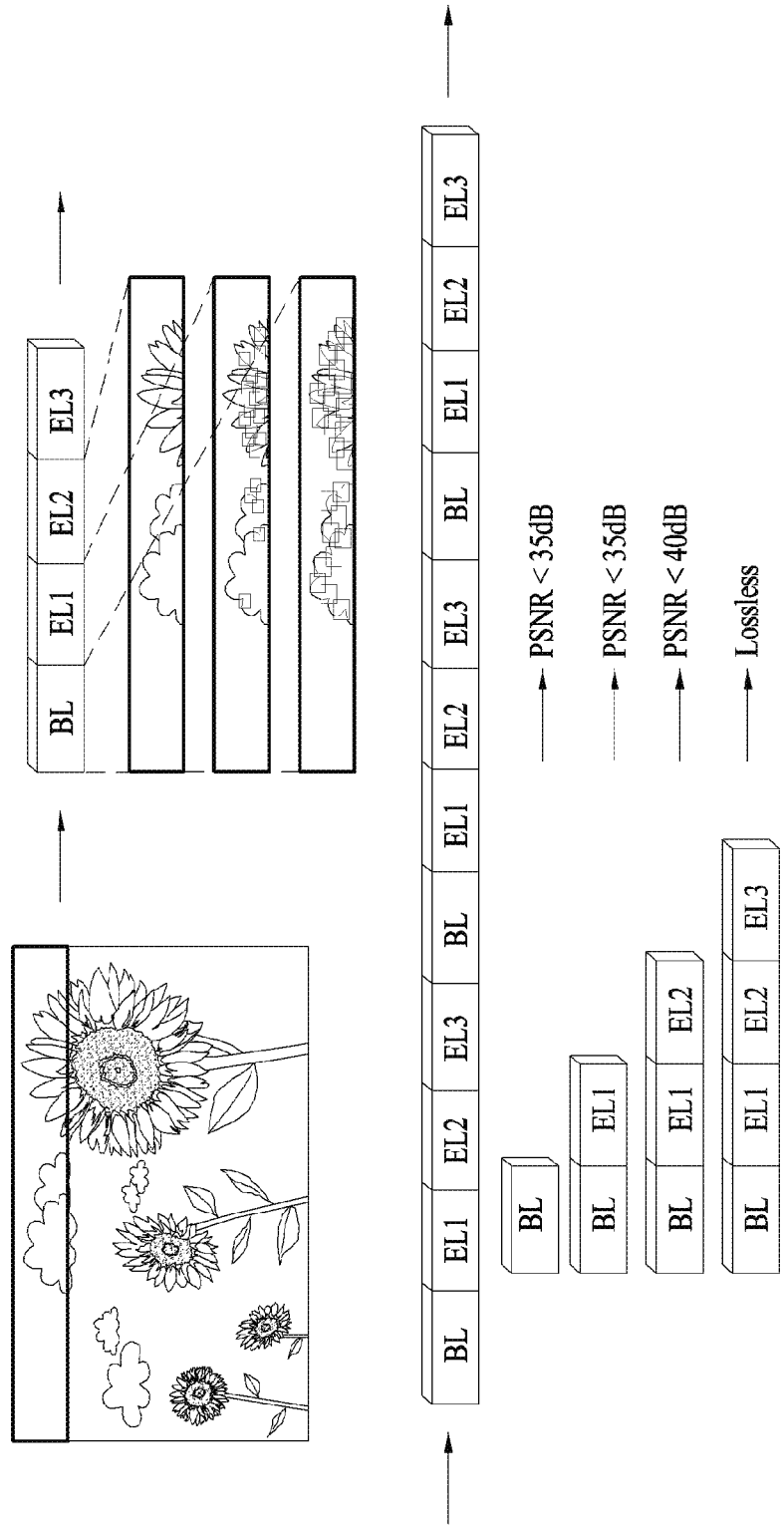
FIG. 10 is a diagram showing an example of an SVC bit stream according to an embodiment of the present invention.

FIG. 10 is a diagram showing an example of an SVC bit stream according to an embodiment of the present invention.

As described above, the SVC bit stream may include one or more ELs continuous to one BL according to a link status and a priority of data. In addition, the ELs may be divided into two or more types (e.g., EL1, EL2, etc.) according to a priority of data. As described above, the BL provides basic image quality of video data, is mandatorily included in one bit stream, and has higher priority than other layers. In contrast, the EL is selectively added in order to improve image quality of video data. The BL is combined with the EL to provide improved image quality.

The encoder may determine whether the ELs are added to the BL to configure the bit stream or the number of added ELs, according to a priority of data (e.g., the amount of compressed data). The priority of data may be determined by determining whether a peak signal to noise ratio (PSNR) of the bit stream satisfies a predetermined criterion. The PSNR quantitatively indicates a difference between different images. As PSNR increases, resistance to noise increases.

For example, if it is assumed that the BL is mandatorily included in one bit stream and a maximum of three ELs is further included according to a priority of data, only the BL is included if the PSNR of a certain bit stream is less than 35 dB. The number of ELs added to the BL is set to one if the PSNR is in a range of 35 to 40 dB and the number of added ELs is set to two if the PSNR is greater than 40 dB. At this time, if three ELs are added to the bit stream, image quality deterioration may be minimized (lossless) in a transmission process.

The bit stream of the video data including one or more layers is transmitted to the MAC layer so as to configure the MAC packet for transmission to the reception device.

The MAC layer 71 according to the embodiment of the present invention may transmit information about the layer configuring the bit stream to the PHY layer 72 which is a lower layer through the header of the MAC packet.

Figure 11:
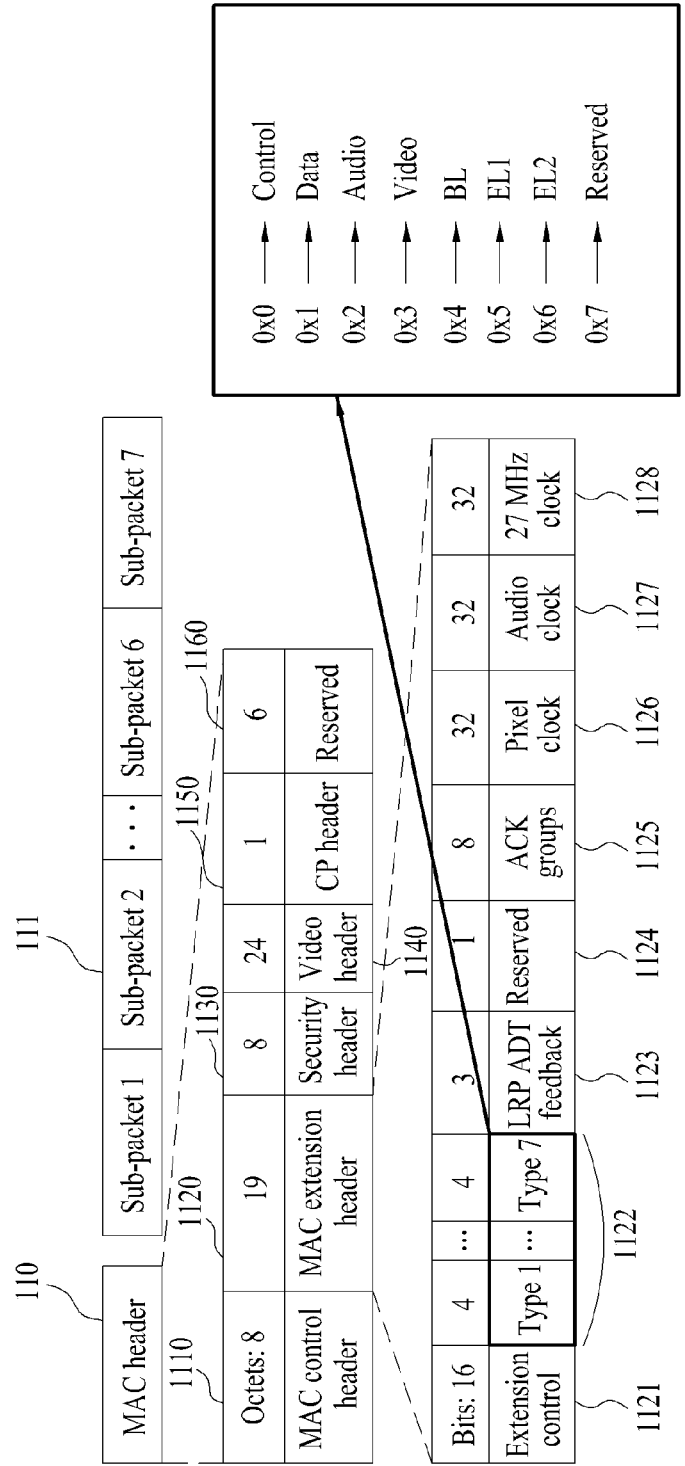
FIG. 11 is a diagram showing an example of an HRP transfer rate of each layer of a WVAN device according to an embodiment of the present invention.

FIG. 11 is a diagram showing an example of a MAC packet header transmitted from a WVAN device according to an embodiment of the present invention and, more particularly, an example of an HRP MAC header format.

Referring to FIG. 11, a general MAC packet includes a MAC header 110 and a packet body 111 including a plurality of subpackets. The MAC header may be divided into an HRP MAC header and an LRP MAC header.

The HRP MAC header 110 shown in FIG. 11 may include a MAC control header 1110, a MAC extension header 1120, a security header 1130, a video header 1140, a CP header 1150 and a reserved region 1160. The MAC control header 1110 includes packet control matters such as a protocol of a transmitted packet or a packet type, identification for identifying a device for transmitting the packet, identification for identifying a device for receiving the packet, etc.

The MAC extension header 1120 includes information about a link with a high transfer rate among links used to transmit data, information about an HRP mode and an LRP mode and one or more ACK groups. The ACK groups correspond to subpackets included in the packet body field.

The security header 1130 includes information for identifying a key used for encryption and authentication of data transmitted through the packet.

The video header 1140 included only in the HRP MAC header includes information about the display order or location of the video data in the reception device which receives the video data.

The CP header 1150 is used to transmit content protection information of the packet and the form of the CP header may be variously implemented according to a content protection method used in the data.

The MAC extension header 1120 includes an extension control region 1121, a region 1122 including data type information included in a subpacket configuring a MAC packet, a region 1123 including LRP ADT feedback information, a reserved region 1124, a region 1125 including ACK group information, a region 1126 including clock information of video data (e.g., pixel), a region 1127 including clock information of audio data and a region 1128 including clock information of 27 MHz in a source device.

The region 1122 including the data type information includes information including the type of the data transmitted in a state of being included in the subpacket configuring the packet along with the MAC header. In addition, information about the MAC/PHY layer configuring the video data according to the above-described embodiment may be transmitted through the data type region 1122.

For example, control information is transmitted through the subpacket if the bit value set in the data type region 1122 is "0", data other than A/V data is transmitted through the subpacket if the bit value set in the data type region 1122 is "1", audio data is transmitted through the subpacket if the bit value set in the data type region 1122 is "2", and video data is transmitted through the subpacket if the bit value set in the data type region 1122 is "3".

Next, in FIG. 10, if it is assumed that the number of ELs configuring one bit stream is a maximum of 3 according to the above-described embodiment, the type of the layer configuring a bit stream may be represented through the bit values "4" to "7" set in the data type region 1122.

For example, a layer configuring a bit stream for transmitting compressed (or encoded) video data included in a subpacket corresponds to a BL if the bit value set in the data type region 1122 is "4" and a layer of compressed video data included in a subpacket corresponds to EL1 if the bit value set in the data type region 1122 is "5". In addition, a layer of compressed video data included in a subpacket corresponds to EL2 if the bit value set in the data type region 1122 is "6" and a layer of compressed video data included in a subpacket corresponds to EL3 if the bit value set in the data type region 1122 is "7".

The use of the region is reserved if the bit value set in the data type region 1122 is "8" to "F".

If layer type information of video data included in a subpacket is included in a MAC header, a PHY layer or a reception device which receives the layer type information may easily identify information about data through the layer type information included in the subpacket.

Next, the LRP ADT feedback region 1123 includes antenna direction tracking (ADT) feedback information for implementing an optimal transmission pattern when a signal will be transmitted in the future in an LRP single-direction mode. A bit value set in the LRP ADT feedback region 1123 indicates index information of an optimal transmission device antenna direction measured from an LRPDU of a lastly received short-omni LRP preamble or an ADT postamble region of a preceding single-direction ACK packet.

The ACK group region 1125 includes one or more regions including information about a subpacket and a region including information indicating whether a packet check sequence (PCS) is used. Since one packet includes a MAC header and a packet body including a maximum of 7 subpackets, the number of regions including the information about the subpacket configuring the ACK group is a maximum of 7. Each subpacket information region configuring the ACK group region includes information indicating whether a preceding subpacket is present.

A maximum of 5 ACK groups may be defined and a reception device which receives a data packet including ACK group information transmits, to a transmission device, an ACK/NACK signal including information indicating whether a subpacket is received with respect to each ACK group.

The bit stream of the video data divided and compressed in slice units by the A/V data packetizer 710 according to the above-described embodiment includes one BL and a maximum of three ELs and is transmitted to the MAC layer. The MAC layer 71 may configure a MAC packet so as to represent type information of a layer configuring each bit stream through the extension header of the MAC packet.

The MAC packet shown in FIG. 11 is transmitted to the PHY layer for transmission to the reception device.

The PHY layer 72 may variously implement the processing amount of layers configuring video data according to change in channel status and variously implement a source rate according to images. More specifically, the PHY layer may check the type information of the layer configuring video data through the MAC header of the MAC packet and adaptively schedule transmission priority and/or transmission mode of each layer.

First, the PHY layer may derive type information of data included in each subpacket through the MAC extension header of the received MAC packet and variously schedule the transmission mode of each layer according to a priority of data. At this time, the MAC header according to the embodiment of the present invention may include type information (e.g., BL, EL1, EL2, EL3, etc.) of the video data separated and compressed in layer units included in the subpacket.

Accordingly, the PHY layer may read layer type information included in the MAC header and differently apply the transmission mode to each subpacket including each layer according to a priority of data.

The HARP transmission mode includes parameters regarding a transmission mode, such as a data coding mode, a modulation scheme, a coding rate and a data transfer rate, and a plurality of transmission modes is indexed according to the parameters.

As the data coding mode, an equal error protection (EEP) mode, an unequal error protection (UEP) mode and a coding mode for retransmitting only a most significant bit may be used.

As the modulation scheme, a quadrature phase shift keying (QPSK) scheme or a 16-quadrature amplitude modulation (QAM) scheme may be used.

The coding rate may be differently applied to a most significant bit and a least significant bit of bits configuring a subpacket or the same coding rate may be applied to bits configuring one subpacket.

By variously configuring the parameters associated with the transmission mode, various HRP transmission modes may be indexed and the HRP transmission mode may be adaptively applied in subpacket units according to degrees of importance of data to be transmitted or channel environments.

For example, with respect to a BL which is a basic layer of video data according to an embodiment of the present invention, an HRP transmission mode 0 supporting an EEP coding mode, a QPSK modulation scheme, a coding rate of ⅓ and a data transfer rate of about 0.952 may be supported. That is, a BL with a high priority of data may be transmitted in a stable transmission mode of a low rate, thereby improving video image quality. As another example, an EL may be transmitted in an HRP transmission mode 1 using a transfer rate higher than that of HRP transmission mode 0 and the same coding rate and modulation scheme as HRP transmission mode 0.

Figure 12:
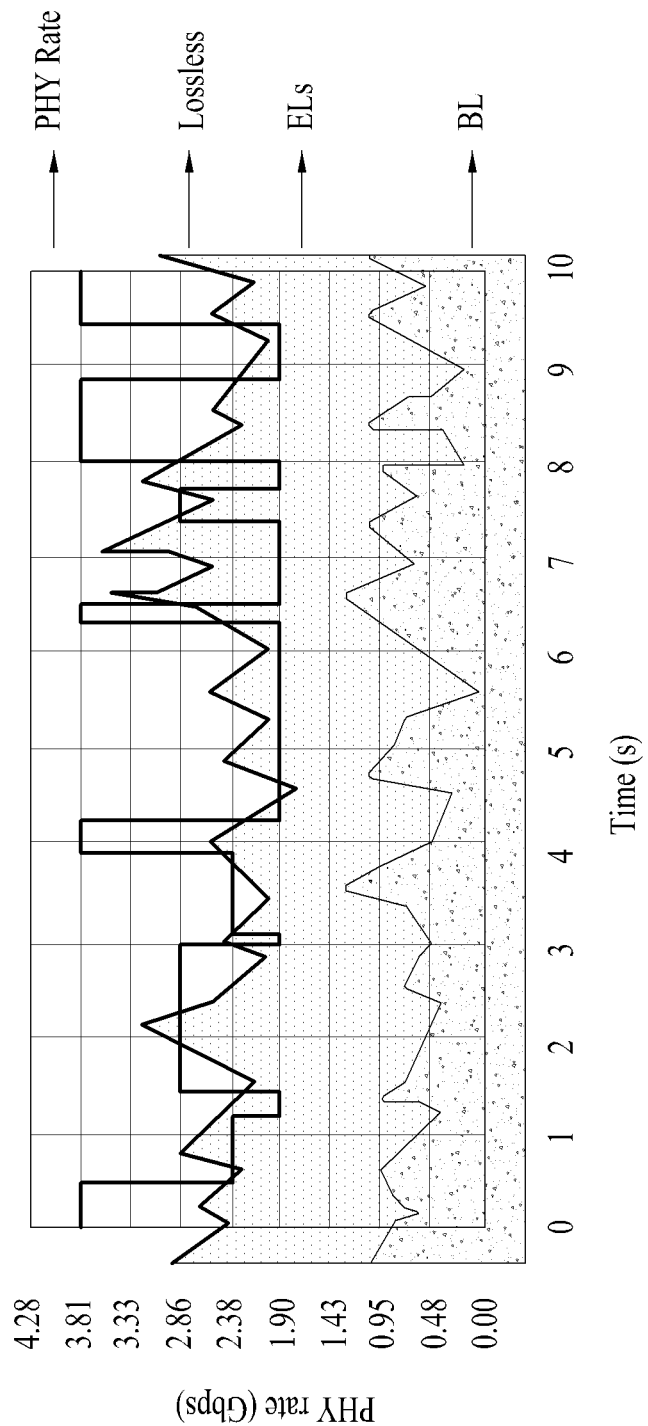
FIG. 12 is a graph showing an example of an HRP transfer rate of each layer of video data according to an embodiment of the present invention.

FIG. 12 is a graph showing an example of an HRP transfer rate of each layer of video data according to an embodiment of the present invention and, more particularly, a transfer rate of each layer in order to represent optimal video image quality.

Referring to FIG. 12, a stable PHY transmission mode of a low rate (e.g., a maximum transfer rate of 1.2 Gbps) is supported with respect to a BL with a high priority of data and a PHY transmission mode of a transfer rate higher than that of the BL is supported with respect to an EL. The HRP transfer rate of the EL may be adjusted to a maximum of 3.81 Gbps according to the number of ELs added. At this time, as described with reference to FIG. 10, if at least a predetermined number (e.g., three) of ELs is added to one BL, a high-rate transmission mode in which the added ELs are not lost may be supported.

In particular, a Reed-Solomon (RS) code may be added to a BL with a highest priority of video data so as to improve transmission reliability. The RS code is a bit which is added in order to correct errors in data in which noise or errors occurs during transmission and restore original data. By adding the RS bit, it is possible to reduce error occurrence rate and increase transmission reliability.

A transmission device which transmits data may configure an available HRP transmission mode for diversifying a transfer rate or a coding/modulation method of each layer whenever transmission is performed. Alternatively, the HRP transmission mode may be set in the transmission device in advance.

Second, the PHY layer may determine whether the layer is retransmitted in association with whether or not the ACK/NACK signal for each layer is received from the reception device. With respect to a BL with a high priority of data and high transmission priority, the same data may not be retransmitted or a lower layer may not be transmitted until the ACK signal is received from the reception device. With respect to a BL with low priority, next data may be processed to be transmitted without determining whether the ACK signal is received from the reception device.

Third, if the same data must be retransmitted due to ACK signal transmission failure, a determination as to whether retransmission is performed is made according to transmission priority of each layer. For example, if EL3 with low priority must be retransmitted and a next transmission layer is a BL with high priority, scheduling may be performed such that EL3 is not retransmitted and EL1 is transmitted when EL2 with low priority is transmitted in order to retransmit EL1 with high priority.

A signal transmission system including a WVAN device which can perform the above-described embodiments will be described with reference to FIG. 13.

Figure 13:
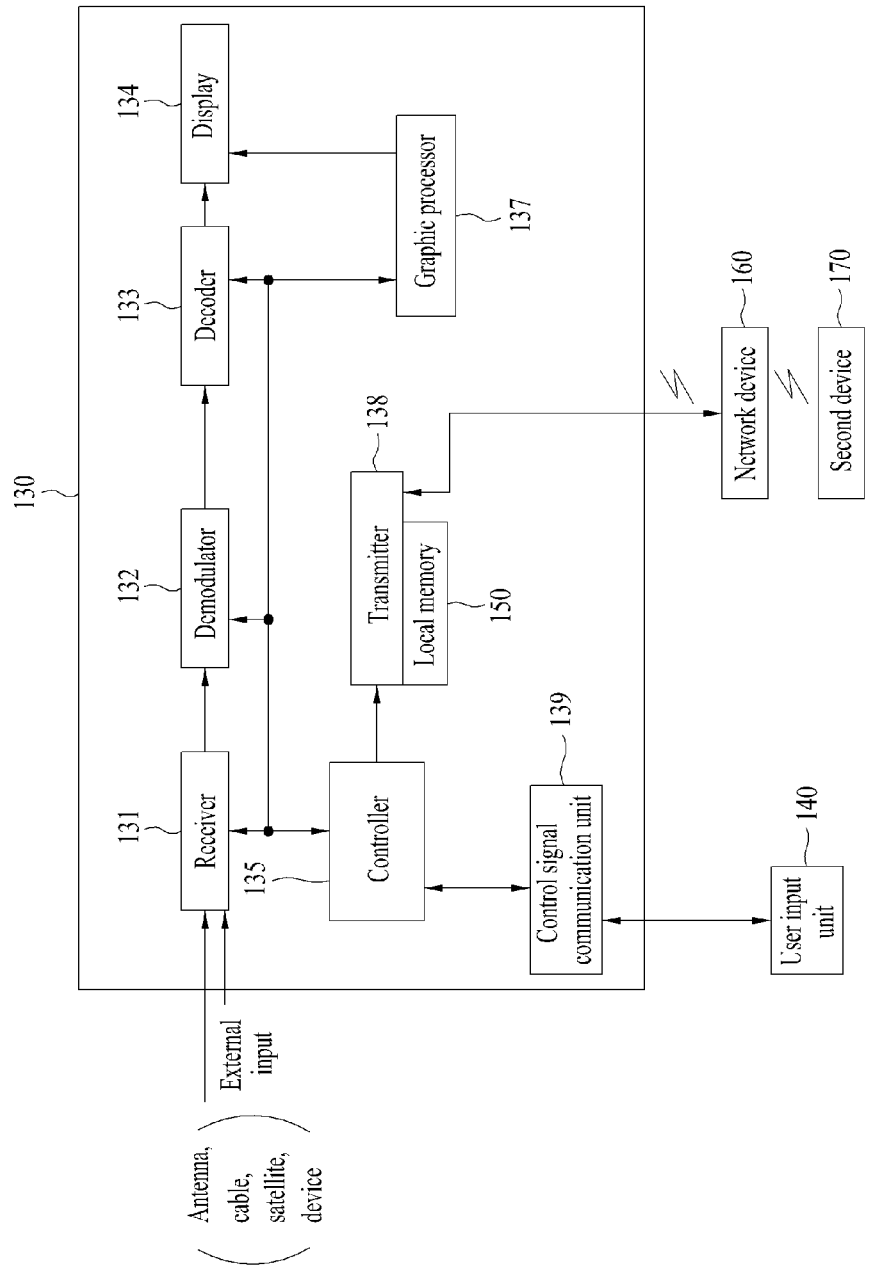
FIG. 13 is a diagram showing an example of a signal processing system including a WVAN device according to an embodiment of the present invention.

FIG. 13 is a diagram showing an example of a signal processing system including a WVAN device according to an embodiment of the present invention.

In general, the WVAN device may reproduce A/V data received from at least one of a broadcast station, a cable, a satellite and another WVAN device through an antenna after performing the following process. The WVAN device may become a reception device when receiving data from another device and may become a transmission device when transmitting data to another device.

Referring to FIG. 13, the signal processing system according to the embodiment of the present invention includes a first device 130 for performing an operation for transmitting data, a remote controller 140, a local memory 150, and a network device 160 for performing wireless communication with a second device 170 for performing an operation for receiving data.

Hereinafter, in the embodiment describing the signal processing system of FIG. 13, it is assumed that the first device is a transmission device and the second device is a reception device.

The transmission device 130 may include a reception unit 131, a demodulator 132, a decoding unit 133, a display 134, a controller 135, a graphics processor 137, a transmission unit 138 and a control signal communication unit 139.

The transmission device further includes a local memory 150. Although an example in which the local memory 150 is directly connected to the transmission unit 138 including an input/output port is described, the local memory may be mounted in the transmission device 130.

The transmission unit 138 may communicate with the wired/wireless network device 160 and may be connected to at least one device 170 over a wireless network through the network device 160. The control signal communication unit 139 may receive a user control signal and output the received signal to the controller 135 using a user control device such as a remote controller.

The reception unit 131 may be a tuner which receives a broadcast signal of a specific frequency through at least one of a terrestrial wave, a satellite, a cable or the Internet. The reception unit 131 may include tuners respectively corresponding to broadcast sources such as a terrestrial wave, a cable, a satellite and a private broadcast or may include an integrated tuner. If the reception unit 131 is a terrestrial broadcast tuner, at least one digital tuner and at least one analog tuner may be included or an integrated digital/analog tuner may be included.

The reception unit 131 may receive an Internet Protocol (IP) stream transmitted through wired/wireless communication. If the IP stream is received, the reception unit 131 may process a transmitted/received packet according to an IP protocol for setting source and destination information with respect to a received IP packet and a packet transmitted by a receiver. The reception unit 131 may output a video/audio/data stream included in the received IP packet according to the IP protocol and generate and output a transport stream to be transmitted to a network as an IP packet according to the IP protocol. The reception unit 131 receives an externally input video signal and may receive, for example, an A/V signal in an IEEE 1394 format or a stream in a HDMI format from an external device.

The demodulator 132 demodulates a broadcast signal of data received through the reception unit 131 or a broadcast signal transmitted by the reception device. The demodulator 132 demodulates the broadcast signal and outputs a broadcast stream. If the reception unit 131 receives a signal of a stream format, for example, an IP stream, the IP stream bypasses the demodulator 132 and is input to the decoding unit 133.

The decoding unit 133 includes an audio decoder and a video decoder, decodes the broadcast stream output from the demodulator 132 according to a decoding algorithm and outputs the decoded broadcast steam to the display 134. At this time, a demultiplexer (not shown) for demultiplexing the stream according to an identifier may be further included between the demodulator 132 and the decoding unit 133. The demultiplexer may demultiplex the broadcast signal into an audio element stream (ES) and a video ES and respectively output the audio ES and the video ES to the audio decoder and the video decoder of the decoding unit 133. If a plurality of programs is multiplexed in one channel, only a broadcast signal of a program selected by a user may be divided into a video ES and an audio ES. If a data stream or a system information stream is included in the demodulated broadcast signal, it is demultiplexed by the demultiplexer and is sent to a decoding block (not shown).

The display 134 may display broadcast content received from the reception unit 131 or content stored in the local memory 150. The display may display a menu for displaying information indicating whether a memory is mounted or information associated with the residual storage capacity of the memory according to a control command of the controller 135 and operate according to user control.

The controller 135 may control operations of the above-described components (the reception unit, the demodulator, the decoding unit, the display, the graphics processor, a spatial multiplexing precoder and beamforming module, and an interface). The controller may execute an application for displaying a menu for receiving a user control command or displaying a variety of information or menus of a broadcast signal processing system to a user.

For example, the controller 135 may read content stored in the local memory 150 if the local memory 150 is mounted. The controller 135 may store broadcast content received from the reception unit 131 in the local memory 150 if the local memory 150 is mounted. The controller 135 may output a signal for controlling mount of the local memory 150 depending on whether the local memory 150 is mounted.

The controller 135 may check the residual storage capacity of the local memory 150 and display information about the residual storage capacity on the display 134 through the graphics processor 137 to the user. The controller may transfer and store content stored in the local memory 150 to and in a remote memory if the residual storage capacity of the local memory 150 is insufficient. In this case, the controller 135 may display a menu to the user indicating whether the content stored in the local memory 150 is transferred to and stored in another local memory (not shown) or a remote memory on the display 134. The controller may receive and process a user control signal. Accordingly, the controller 135 may transfer content stored in the local memory 150 and the remote memory to each other.

The controller 135 performs overall control and operation of a protocol layer implemented in the WVAN device described with reference to FIG. 7, separates and compresses video data in layer units according to the above-described embodiments of the present invention, and configures a packet such that information about each layer is contained in a packet header portion.

That is, whether a layer of video data included in each subpacket configuring a MAC packet is a BL or an EL is indicated through the data type region of the MAC header included in the MAC packet.

The controller 135 may schedule a transmission mode of a subpacket including each layer, transmission priority, ACK/NACK for each layer and retransmission based on the layer type information. The packet scheduled in association with the transmission mode may be transmitted to the transmission unit 138 and transmitted to the reception device 170 through the network device 160.

The graphics processor 137 processes graphics to be displayed so as to display a menu screen in a video image displayed on the display 134 and displays the graphics on the display 134.

The transmission unit 138 may be used to transmit the data packet generated by the controller 135 to the device 170 through a wired/wireless network or to transmit data from the transmission device 130 to another device.

The transmission unit 138 may include an interface for performing bidirectional communication between devices belonging to the WVAN. The interface may interface with at least one reception device 170 over a wired/wireless network and examples thereof include an Ethernet module, a Bluetooth module, a short-range wireless Internet module, a portable Internet module, a home PNA module, an IEEE1394 module, a PLC module, a home RF module, an IrDA module, etc.

Next, it is assumed that the first device 130 of the broadcast processing system shown in FIG. 13 is a reception device and the second device 170 is a transmission device.

A packet received by the reception device 130 from the transmission device through the reception unit 131 is sent to the decoding unit 133 through the demodulator 132. The decoding unit 133 decodes a broadcast stream output from the demodulator 132 according to a decoding algorithm and outputs the decoded broadcast stream to the display 134.

At this time, the decoding unit 133 may determine decoding priority based on layer type information included in a header portion of the received MAC packet. For example, decoding priority of a BL with a high priority of data may be set to be lower than that of an EL with a low priority of data. At this time, even when all a plurality of subpackets included in the MAC packet is not read, layer type information may be identified through the MAC header portion. Accordingly, the decoding order of each subpacket included in the packet may be arbitrarily determined according to layer type.

A demultiplexer (not shown) for demultiplexing each stream according to an identifier may be further included between the demodulator 132 and the decoding unit 133. The demultiplexer may demultiplex a broadcast signal into an audio bit stream and a video bit stream and respectively output the audio bit stream and the video bit stream to the audio decoder and the video decoder of the decoding unit 133. If a plurality of programs is multiplexed in one channel, only a broadcast signal of a program selected by a user may be divided into a video ES and an audio ES. If a data stream or a system information stream is included in the demodulated broadcast signal, it is demultiplexed by the demultiplexer and is sent to a decoding block (not shown).

The controller 135 of the reception device may determine whether an ACK signal is transmitted for each subpacket received from the transmission device according to ACK signal checking policy independently applied to each layer of video data in the transmission device. That is, as in the above-described embodiments, a determination as to whether an ACK signal is transmitted is made depending on whether reception is successfully performed in case of a BS, but an ACK signal may not be transmitted even when reception is successfully performed in case of an EL.

Figure 14:
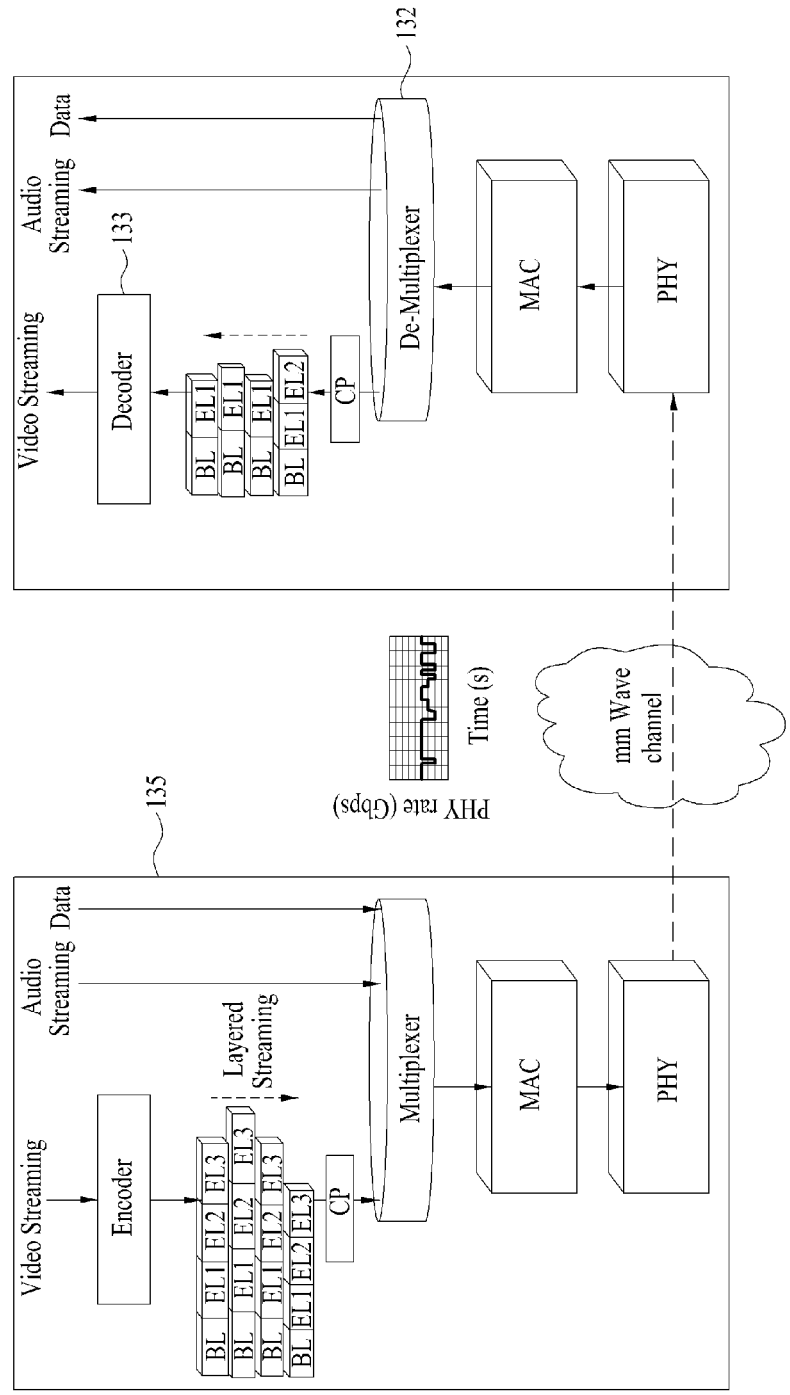
FIG. 14 is a diagram showing an example of a process of performing bit streaming between a transmission device and a reception device of a broadcast processing system according to an embodiment of the present invention.

FIG. 14 is a diagram showing an example of a process of performing bit streaming between a transmission device and a reception device of a broadcast processing system according to an embodiment of the present invention shown in FIG. 13.

In FIG. 14, the transmission device corresponds to a source device and the reception device corresponds to a device. A bit stream of video data configured according to the above-described embodiment is streamed from the source device to the sink device as shown in FIG. 14.

The above-described terms may be replaced with other terms. For example, the term "device" may be replaced with the term "user equipment (or device)", "station", etc., and the term "coordinator" may be replaced with the term "coordination (or control) apparatus", "coordination (or control) device", "coordination (or control) station", "coordinator", or "Piconet Coordinator (PNC)". A WVAN parameter configuring a WVAN may have the same meaning as network configuration information.

It will be apparent that some claims referring to specific claims may be combined with other claims referring to the other claims other than the specific claims to constitute the embodiment or add new claims by means of amendment after the application is filed.

The above-described terms may be replaced with other terms. For example, the term "device" may be replaced with the term "user equipment (or device)", "station", etc., and the term "coordinator" may be replaced with the term "coordination (or control) apparatus", "coordination (or control) device", "coordination (or control) station", "coordinator", or "Piconet Coordinator (PNC)". A data packet is a generic term for transmitted/received information such as a message, traffic, a video/audio data packet, a control data packet and is not limited to a specific data packet.

As the device for performing communication in a communication system, all digital apparatuses such as a computer, a personal digital assistant (PDA), a laptop, a digital TV, a camcorder, a digital camera, a printer, a microphone, a speaker, a headset, a barcode reader, a display, a mobile phone, etc. may be used.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention supports a wireless communication system and a WIHD system. In addition, the embodiments of the present invention are applicable not only to the wireless communication system and the WIHD system but also to all technical fields using the same.

The invention claimed is:

1. A method for transmitting a packet at a transmission device in a wireless network, the method comprising:
receiving, by a medium access control (MAC) layer, video data divided into a plurality of slices and compressed into one or more layers from a higher layer, the one or more layers including a base layer that is mandatorily included in the compressed video data and one or more enhancement layers that are selectively included in the compressed video data;
receiving, by the MAC layer, layer type information from the higher layer, the layer type information indicating one of the base layer, a first enhancement layer having a higher priority, and a second enhancement layer having a lower priority, wherein the layer type information informs a physical layer of a priority of each of the one or more layers;
configuring, by the MAC layer, a medium access control (MAC) packet such that the MAC packet comprises the compressed video data and the layer type information, the layer type information being included in a MAC extension header of the MAC packet;
transmitting, by the MAC layer, the MAC packet to the physical layer for transmission to a reception device; and
scheduling, by the physical layer, a transmission mode of each layer included in the MAC packet based on the layer type information.

2. The method according to claim 1, wherein the video data is compressed into the base layer or the one or more enhancement layers according to a priority of each of the video data divided into the plurality of slices.

3. The method according to claim 1, wherein the MAC packet is configured based on the layer type information.

4. The method according to claim 1, wherein the MAC extension header comprises an extension control region, a region including type information of data to be transmitted through each of a plurality of subpackets included in the MAC packet, a region including antenna direction tracking feedback information, a region including Acknowledgement (ACK) signal group information, and one or more regions including clock information of data, and wherein the layer type information is included in the region including the type information of the data.

5. The method according to claim 1, wherein the transmission mode is divided according to parameters regarding a data coding mode, a modulation scheme, a coding rate, and a data transfer rate configuring the transmission mode.

6. A transmission device of a wireless network, the transmission device comprising:
a transmission module configured to transmit a data packet; and
a processor configured to:
divide video data into a plurality of slices;
compress the video data into one or more layers that include a base layer that is mandatorily included in the compressed video data and one or more enhancement layers that are selectively included in the compressed video data;
configure a medium access control (MAC) packet such that the MAC packet comprises the compressed video data and layer type information indicating one of the base layer, a first enhancement layer having a higher priority, and a second enhancement layer having a lower priority, the layer type information being included in a MAC extension header of the MAC packet, wherein the layer type information informs a physical layer of a priority of each of the one or more layers; and
cause the transmission module to transmit the MAC packet to the physical layer,
wherein the layer type information is received by a medium access control (MAC) layer from a higher layer, and wherein the physical layer schedules a transmission mode of each layer included in the MAC packet based on the layer type information.

7. The transmission device according to claim 6, wherein the processor is further configured to compress the video data into the base layer or the one or more enhancement layers according to a priority of each of the video data divided into the plurality of slices when compressing the video data into the one or more layers.

8. The transmission device according to claim 6, wherein the MAC extension header comprises an extension control region, a region including type information of data to be transmitted through each of a plurality of subpackets included in the MAC packet, a region including antenna direction tracking feedback information, a region including Acknowledgement (ACK) signal group information, and one or more regions including clock information of data, and wherein the layer type information is included in the region including the type information of the data.

* * * * *